(12) United States Patent
Kurita

(10) Patent No.: US 6,544,675 B1
(45) Date of Patent: *Apr. 8, 2003

(54) FUEL CELL SYSTEM

(75) Inventor: Kenji Kurita, Nagoya (JP)

(73) Assignee: Aisin Seiki Kabushiki Kaisha, Kariya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 58 days.

(21) Appl. No.: 09/420,571

(22) Filed: Oct. 19, 1999

(30) Foreign Application Priority Data

Oct. 19, 1998 (JP) .......................... 10-296673

(51) Int. Cl.⁷ .......................... H01M 8/04; H01M 8/18
(52) U.S. Cl. .......................... 429/19; 429/20; 429/22
(58) Field of Search .......................... 429/19, 20, 22, 429/34

(56) References Cited

U.S. PATENT DOCUMENTS

| | | | | |
|---|---|---|---|---|
| 4,743,516 A | * | 5/1988 | Noguchi et al. | 429/16 |
| 4,820,594 A | * | 4/1989 | Sugita et al. | 429/17 |
| 5,648,182 A | * | 7/1997 | Hara et al. | 429/20 |
| 5,925,476 A | * | 7/1999 | Kawatsu | 429/24 |
| 6,001,499 A | * | 12/1999 | Grot et al. | 429/22 |
| 6,083,637 A | * | 7/2000 | Walz et al. | 429/17 |
| 6,103,411 A | * | 8/2000 | Matsubayashi et al. | 429/17 |
| 6,106,963 A | * | 8/2000 | Nitta et al. | 429/19 |

FOREIGN PATENT DOCUMENTS

JP 8-293312 11/1996

* cited by examiner

Primary Examiner—Carol Chaney
Assistant Examiner—Tracy Dove
(74) Attorney, Agent, or Firm—Oblon, Spivak, McClelland, Maier & Neustadt, P.C.

(57) ABSTRACT

A fuel cell system includes a reforming device 1 for reforming a fuel of hydrocarbon family to a fuel gas whose principal component is hydrogen, a fuel-cell stack 2 for generating electricity by using the fuel gas and an oxidizing agent, a gauge 7 for determining a concentration of CO in a fuel gas exhausted from the reforming device 1, a burning device 3 for burning the fuel gas, the burning device 3 being independent of the fuel-cell stack 2, and a switching device 8 for directing the fuel gas to either the fuel-cell stack 2 or the burning device 3. In such a fuel system control at initiation and cooling down time at termination become easy and shorter.

6 Claims, 1 Drawing Sheet

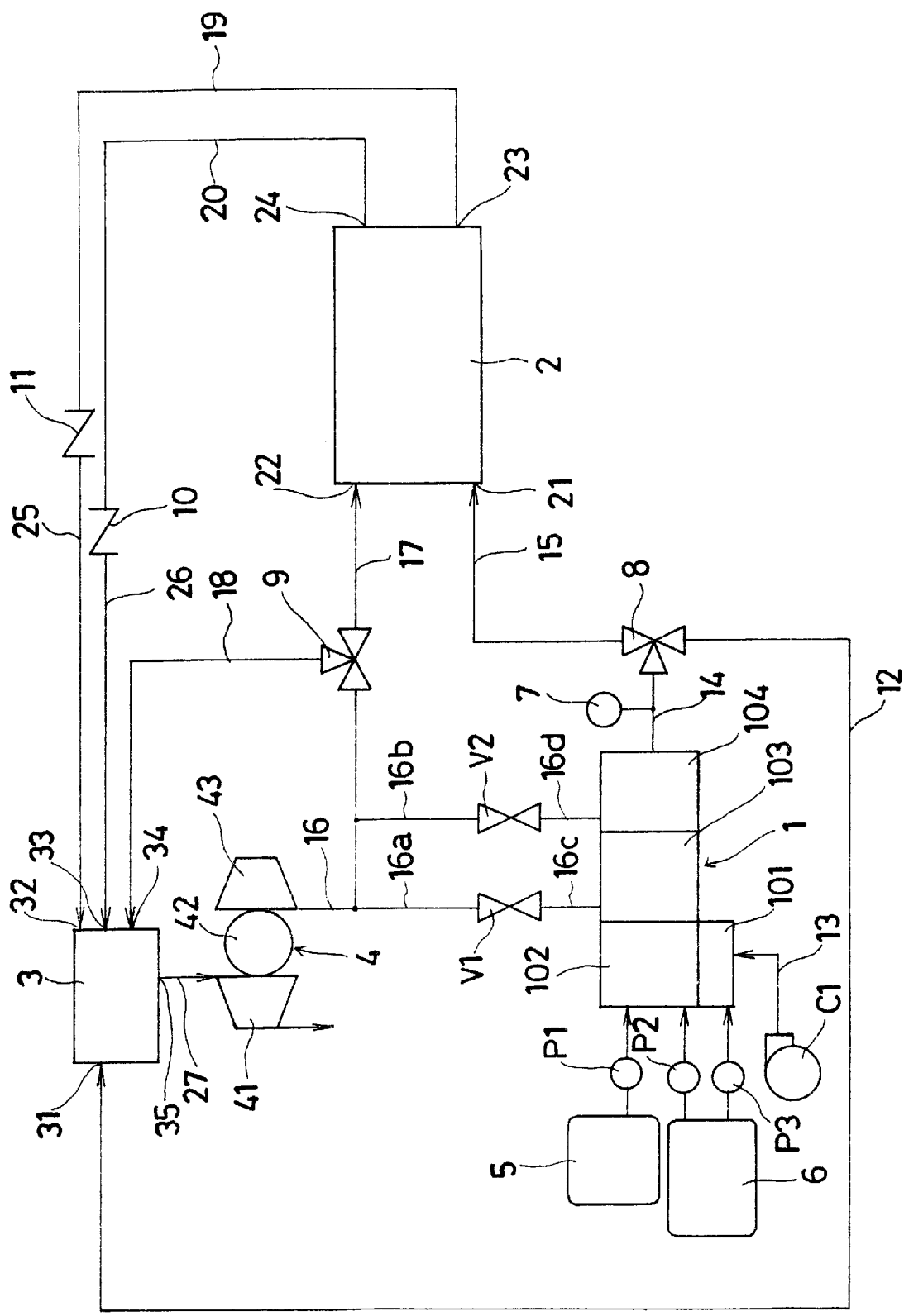

FUEL CELL SYSTEM

BACKGROUND OF THE INVENTION

1. Field of the Invention

The present invention is directed to a fuel system.

2. Description of the Related Art

A conventional fuel cell system is disclosed in, for example, Japanese Patent Laid-open Print No. Hei.8-293312 published without examination on Nov. 5, 1996. In this fuel cell system, upon start up and shut off, the fuel gas having a high concentration of CO and the fuel gas remaining in a reforming device are respectively temporarily fed to an evaporating part, instead of a fuel-cell stack at which water and the hydrocarbon family fuel are to be burned. Thus, the CO poisoning of a catalyst is avoided or suppressed.

However, upon start up of the foregoing conventional fuel cell system, the amount of water and hydrocarbon family fuel to be evaporated should be balanced with the burning amount in the evaporating part, which causes difficulty in control when the fuel cell system is started. In addition, when the fuel cell system is to be stopped, since the evaporating part is still in a burning operation, the cooling-down stage of the fuel cell system becomes longer and there is a fear of operating the reforming device when it is in its emptied state.

SUMMARY OF THE INVENTION

It is therefore an object of the present invention to provide a fuel cell system which is free from the foregoing drawbacks.

In order to attain a foregoing and other objects, the present invention provides a fuel cell system comprising a performing device for reforming a fuel such as a hydrocarbon or methanol to a fuel gas whose principal component is hydrogen; a fuel-cell stack for generating electricity by using the fuel gas and an oxidizing agent; a gauge for determining a concentration of CO in a fuel gas exhausted from the reforming device; a burner for burning the fuel gas, the burner being independent of the fuel-cell stack and the reforming device; and a switch for selecting supply of the fuel gas to either the fuel-cell stack or the burner.

BRIEF DESCRIPTION OF THE DRAWING

These and other features and advantages of the present invention will be more readily apprehended from the following detailed description when read in connection with the appended sole drawing, which is a schematic diagram of a solid-state polyelectrolyte type fuel cell system according to an embodiment of the present invention.

DETAILED DESCRIPTION OF AN EMBODIMENT OF THE INVENTION.

With reference to the drawing, there is illustrated a schematic diagram of a solid-state polyelectrolyte type fuel cell system according to an embodiment of the present invention. The fuel system includes as its main elements a reforming device 1, a fuel-cell stack 2, a burner 3 as burning means, and a turbo-assist compressor 4. In addition, this system includes a water tank 5 for storing therein an amount of water, a methanol tank 6 for storing an amount of methanol, a CO concentration gauge 7 as a means for detecting CO, 3-way switching valves 8 and 9 as switching means, and other elements.

The reforming device 1 reforms water and methanol, each of which is treated as a fuel for forming a fuel gas whose principal component is hydrogen. The reforming device 1 includes a burning part 101, an evaporating part 102, reforming part 103, and a CO removing part 104. The burning part 101 is connected to the methanol tank 6 by way of a methanol pump P3 and is set to receive compressed air from an air compressor C1 by way of an air conduit 13. The evaporating part 102 is connected to the water tank 5 and to the methanol tank 6 by way of a water pump P1 and a methanol tank P2, respectively.

The reforming device 1 is connected to a first port of the 3-way switching valve 8 via a fuel gas line 14 in which the gauge 7 is provided for determining a CO concentration in the fuel gas discharged from the reforming device 1. A second port of the 3-way switching valve 8 is in fluid communication with an inlet 21 of the fuel-cell stack 2 via line 15, while a third port of the 3-way switching valve 8 is in fluid communication with an air inlet 31 of the burner 3 by way of a fuel gas line 12.

The turbo-assist compressor 4 includes a turbine 41, a motor 42, and a compressor 43. The compressor 43 acts as an oxidizing agent supply means which feeds air as an oxidizing agent after its compression to a first port of the 3-way switching valve 9 by way of an air conduit 16. The compressor 43 is also connected to flow control valves V1 and V2 which are provided in branches 16 and 16b of the air conduit 16, respectively. The flow control valves V1 and V2 are connected to the reforming part 103 and the CO removing part 104 of the reforming device 1 via air conduits 16c and 16d, respectively.

A second port of the 3-way switching valve 9 is connected by line 18 to an air supply port 34 of the burner 3, while a third port of the 3-way switching valve 9 is connected to an air supply port 22 of the fuel-cell stack 2 by way of an air conduit 17.

The fuel-cell stack 2 has an outlet port 23 from which issues gas left untreated or unused. The outlet port 23 is connected via a conduit 19 to a one-way valve 11 which is connected via a conduit 25 to a fuel gas supply port 32 of the burner 3.

The fuel-cell stack 2 also has an outlet port 24 from which issues air left untreated or unused. The outlet port 24 is connected via a conduit 20 to a one-way valve 10 which is connected via a conduit 26 to an air supply port 33 of the burner 3.

The burner 3 burns the unused fuel gas and the fuel gas containing a high CO concentration. The burner 3 also burns the fuel gas remained in the reforming device 1 whenever the fuel cell system is turned off or brought into at-rest. A discharge port 35 of the burner 3 is connected to the turbine 41 of the turbo-assist compressor 4 by way of an exhaust gas conduit 27.

In operation, when the fuel cell system is first turned on, methanol is supplied from the methanol tank to the burning part 101 of the reforming device 1 by the methanol pump P3, the compressor 43 is simultaneously driven by the motor 42 of the compressor 4, and the air compressor C1 is initiated.

The methanol supplied to the burning part 101 is burned therein, with the assistance of the air supplied from the air compressor C1, thereby heating the evaporating part 102.

The evaporating part 102 of the reforming device 5 is supplied with water from the water tank 1 by the water pump P1 and is also supplied with methanol from the methanol tank 6 by the methanol pump P2. The resultant air and the methanol are evaporated in the evaporating part 102 of the reforming device 1, thereby being fed or transferred to the reforming part 103.

The water and the ethanol which are in gas phase are mixed with the air which is supplied from the compressor 43 of the turbo-assist compressor 4 by way of the flow control valve V1. The resultant mixture is reformed into a fuel gas whose principal component is hydrogen according to the following chemical reaction in the presence of a reforming catalyst such as a combination of Pd-catalyst and Cu—Zn-catalyst etc., and the resultant fuel gas is fed to the CO removing part 104:

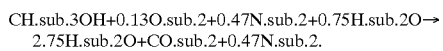

$$CH_3OH+0.13O_2+0.47N_2+0.75H_2O \rightarrow 2.75H_2O+CO_2+0.47N_2.$$

The fuel gas 0.5–1% of CO and the CO is oxidized into $CO_2$, in the presence of CO deleting catalyst such as PT catalyst, by the air supplied from the compressor 43 by way of the flow control valve V2 so as to decrease the CO concentration to equal to or less than 10 ppm, and the resultant $CO_2$ is fed to the fuel cell stack 2.

Immediately after start up of the fuel cell system, the temperature of the reforming part 103 is still insufficient, with the result that the concentration of the CO is still not less than a set value of, say, 10 ppm. If the detection at the gauge 7 indicates that the concentration of the CO is above the set value, the 3-way switching valve 8 is switched or shifted toward the burner 3, thereby feeding the fuel gas to the burner 3 via the conduit 12. To this end, the movement of the switch 8 may be controlled by a controller, not shown, for example a conventional electronic programmable computer, which receives CO signals from the gauge 7. At this time, the 3-way switching valve 9 (also controlled by the controller) allows an air supply from the compressor 43 to the burner 3 by way of the conduit 18.

At the burner 3, the fuel gas supplied thereto from the reforming device 1 is burned with the assistance of the air supplied from the compressor 43. The resultant exhaust gas is fed to the turbine 41 of the turbo-assist compressor 4, thereby establishing a rotation thereof.

When the turbine 41 is brought into rotation, the compressor 43 is rotated together with the turbine 41, which lessens the load of the motor 42, thereby decreasing the electric power consumption of the motor 42. In light of the fact that auxiliary power source is limited in automotive vehicles, such an effect or advantage is of importance.

If the CO concentration is found to be not greater than the set value at the gauge 7, the 3-way switching valve 8 is switched toward the fuel-cell stack 2, which supplies the fuel gas to the inlet port 21, thereby supplying the air to a fuel electrode side (not shown) of the fuel-cell stack 2. Simultaneously, the 3-way switching valve 9 is also set toward the fuel-cell stack 2, which supplies air to the inlet port 22, thereby supplying the air to an oxygen electrode side (not shown).

In the fuel-cell stack 2, as is well known, chemical energy is converted into electric energy, with electric power being produced as a result of chemical the reaction between the electrolyte and the fuel gas. In the fuel-cell stack 2, the hydrogen contained in the fuel gas is not fully or 100% used for the reaction, but about 80% is used. The unused hydrogen is fed to the fuel gas supply port 32 of the burner 3 by way of the conduits 19 and 25 which are arranged in series.

On the other hand, the fuel-cell stack 2 is supplied with air in surplus, which causes a discharge of the unused air from the outlet port 24. The resultant air is fed to the inlet port 34 of the burner 33 by way of the conduits 20 and 26 which are arranged in series.

In the burner 3, the resultant unused fuel gas is burned in the resultant air. The resulting exhaust gas or discharged gas from the burner 3 is fed to the turbine 41, resulting in the rotation thereof. The fuel cell system thus reaches its steady operation mode.

The resultant rotation of the turbine 41 causes the concurrent rotation of the compressor 43, which reduces the load on the motor 42, thereby reducing the electric power consumption of the motor 42. While the fuel cell system is in the steady operation mode, there is a large amount of energy in the unused fuel gas, and so the motor, 42 is not driven.

When the fuel cell system is to be turned off, the 3-way switching valves 8 and 9 are switched toward the burner 3 by the controller, to interrupt the supply of the fuel gas and air to the fuel-cell stack 2. The fuel gas remaining in the fuel-cell stack 2 is pushed out to the burner 3 due to the residual pressure.

Concurrently, the flow control valves V1 and V2 are closed, the pumps P1, P2, and P3 are stopped, and the air compressor C1 is stopped. The water and methanol in the evaporating part 102, the methanol and the air in the burning part, and the air in the CO removing part 104 are isolated.

The residual pressure of the air in the reforming device 1 pushes the methanol and the water which remain therein to the burner 3.

In the foregoing structure, the methanol and the water in the reforming device 1 and the fuel gas in the fuel-cell stack 2 which still remain after termination of the fuel cell system are fed to the burner 3 which is operated independent of the reforming device 1, which establishes quick cooling-down of the reforming device 1 without difficulty, thereby facilitating the quick termination of the fuel cell system.

In the foregoing structure, the required amount of the air supply is attained by operating the turbine which is driven by the fuel energy of the unused fuel gas, which makes the fuel cell system very effective. In addition, the derived force from turbine can be used to rotate an additional dynamo, thereby realizing a system which can generate electricity and supply air concurrently.

The invention has thus been shown and described with reference to specific embodiments, however, it should be understood that the invention is in no way limited to the details of the illustrated structures but changes and modifications may be made without departing from the scope of the appended claims.

What is claimed is:

1. A fuel cell system comprising:

a fuel gas reforming device;

a fuel-cell stack which receives a fuel gas from the fuel gas reforming device, and an oxidizing agent;

a gauge positioned on a gas line connecting the fuel gas reforming device and the fuel-cell stack to determine a concentration of CO in the fuel gas from the reforming device;

a burner independent of the fuel-cell stack and the fuel gas reforming device;

means for supplying unused fuel gas discharged from the fuel-cell stack to the burner;

a turbine receiving an exhaust gas from the burner so as to drive the turbine;

an oxidizing agent supply means for supplying an oxidizing agent to the fuel-cell stack, wherein the turbine is drivingly connected to the oxidizing agent supply means;

a motor, wherein the oxidizing agent supply means is connected so as to be driven by the motor;

a switch positioned between the gauge and the fuel-cell stack on the gas line to switch a supply of the fuel gas from the reforming device to either the fuel-cell stack or the burner; and control means for switching the switch based on the CO concentration determined by the gauge.

2. The fuel cell system as set forth in claim 1, further comprising a dynamo, wherein the turbine is connected so as to drive the dynamo.

3. The fuel cell system as set forth in claim 1, wherein the fuel cell system is a polymer electrolyte fuel cell.

4. A fuel cell system comprising:

a fuel gas reforming device;

a fuel-cell stack which receives a fuel gas from the fuel gas reforming device, and an oxidizing agent;

a gauge positioned on a gas line connected to the fuel gas reforming device and the fuel-cell stack to determine a concentration of CO in the fuel gas from the reforming device;

a burner independent of the fuel-cell stack and the fuel gas reforming device;

means for supplying unused fuel gas discharged from the fuel-cell stack to the burner;

a switch positioned between the gauge and the fuel-cell stack on the gas line to switch a supply of the fuel gas from the reforming device to either the fuel-cell stack or the burner;

a turbine receiving an exhaust gas from the burner so as to drive the turbine;

an oxidizing agent supply means connecting drivingly to the turbine for supplying an oxidizing agent to the fuel-cell stack and the fuel gas reforming device;

a motor, wherein the oxidizing agent supply means is connected so as to be driven by the motor; and control means for switching the switch based on the CO concentration determined by the gauge.

5. The fuel cell system as set forth in claim 4, further comprising a dynamo, wherein the turbine is connected so as to drive the dynamo.

6. The fuel cell system as set forth in claim 4, fuel cell system is a polymer electrolyte fuel cell.

* * * * *